(12) United States Patent
Viswanathan et al.

(10) Patent No.: US 11,294,701 B2
(45) Date of Patent: Apr. 5, 2022

(54) ENHANCED MANAGEMENT OF STORAGE REPOSITORY AVAILABILITY IN A VIRTUAL ENVIRONMENT

(71) Applicant: HEWLETT PACKARD ENTERPRISE DEVELOPMENT LP, Houston, TX (US)

(72) Inventors: Swami Viswanathan, Morgan Hill, CA (US); Thomas M. Kelley, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 305 days.

(21) Appl. No.: 16/245,776

(22) Filed: Jan. 11, 2019

(65) Prior Publication Data

US 2020/0225971 A1 Jul. 16, 2020

(51) Int. Cl.
G06F 9/455 (2018.01)
G06F 16/182 (2019.01)
H04L 67/1097 (2022.01)

(52) U.S. Cl.
CPC ........ *G06F 9/45558* (2013.01); *G06F 16/182* (2019.01); *H04L 67/1097* (2013.01); *G06F 2009/4557* (2013.01); *G06F 2009/45579* (2013.01); *G06F 2009/45583* (2013.01)

(58) Field of Classification Search
CPC ............... G06F 9/45558; G06F 16/182; G06F 2009/4557; G06F 2009/45579; G06F 2009/45583; H04L 67/1097
See application file for complete search history.

(56) References Cited

U.S. PATENT DOCUMENTS

| | | | |
|---|---|---|---|
| 8,352,941 B1 * | 1/2013 | Protopopov | G06F 9/45558 718/1 |
| 9,026,630 B2 * | 5/2015 | Gulati | G06F 9/5044 709/223 |
| 9,734,309 B1 * | 8/2017 | Allen | H04L 63/102 |
| 2018/0150246 A1 * | 5/2018 | Catrein | G06F 3/0605 |
| 2018/0309759 A1 * | 10/2018 | Leibmann | H04L 63/10 |

* cited by examiner

*Primary Examiner* — Gregory A Kessler
(74) *Attorney, Agent, or Firm* — Jaffery Watson Mendonsa & Hamilton

(57) ABSTRACT

Described herein are systems, methods, and software to enhance the management of virtual nodes in a computing environment. In one example, a system is configured to mount storage repositories to a host. Once mounted the system may identify a request to initiate a virtual cluster on the host and may identify permissions associated with the virtual cluster. The system further determines at least one storage repository from the storage repositories for the virtual cluster based on the permissions and initiate execution of the virtual cluster with access to at least one file system corresponding to the at least one storage repository.

18 Claims, 9 Drawing Sheets

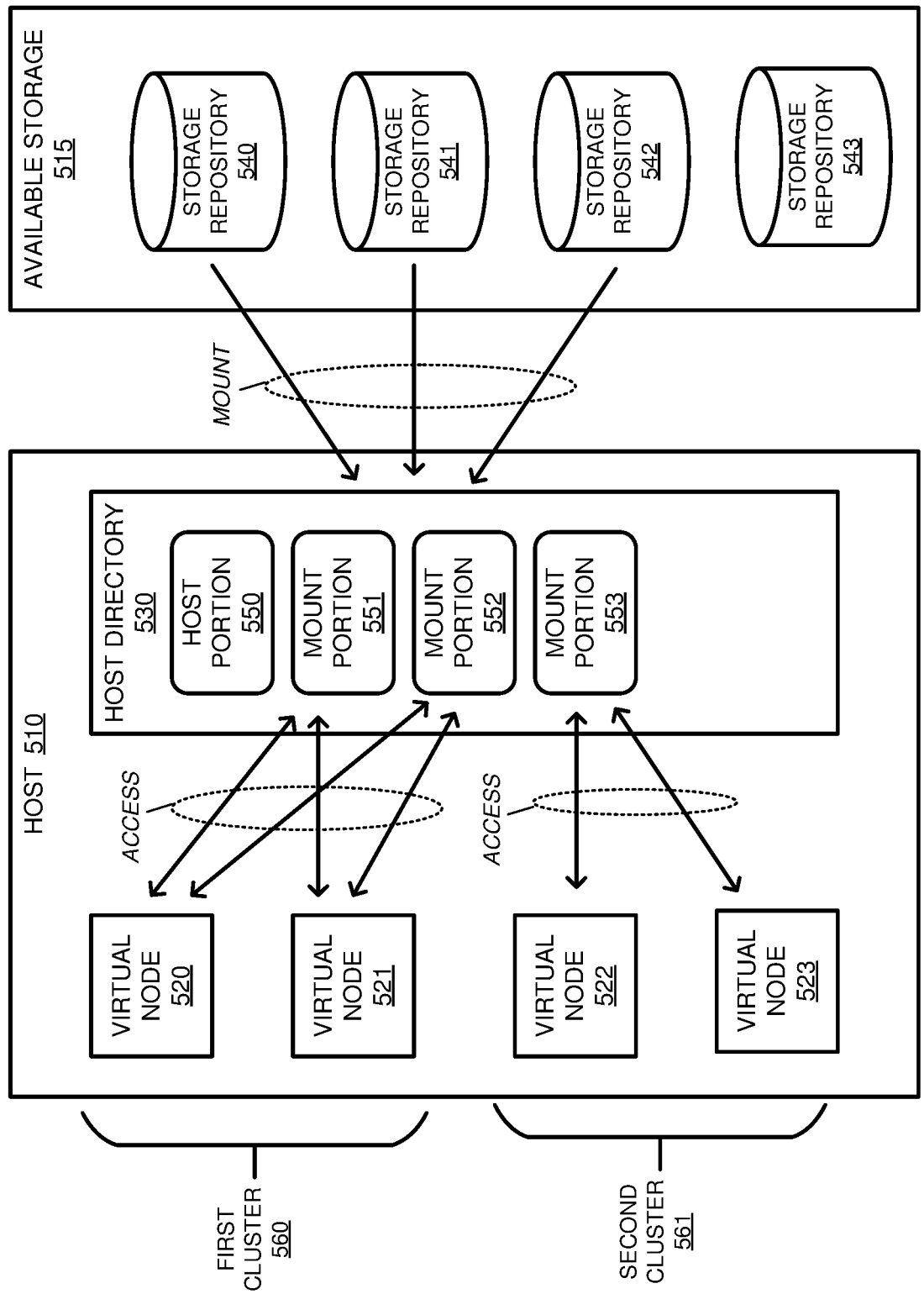

ENHANCED MANAGEMENT OF STORAGE REPOSITORY AVAILABILITY IN A VIRTUAL ENVIRONMENT

TECHNICAL BACKGROUND

An increasing number of data-intensive distributed applications are being developed to serve various needs, such as processing very large data sets that are difficult to be processed by a single computer. Instead, clusters of computers are employed to distribute various tasks, such as organizing and accessing the data and performing related operations with respect to the data. Various large-scale processing applications and frameworks have been developed to interact with such large data sets, including Hive, HBase, Hadoop, Spark, among others.

At the same time, virtualization techniques have gained popularity and are now commonplace in data centers and other computing environments in which it is useful to increase the efficiency with which computing resources are used. In a virtualized environment, one or more virtual nodes are instantiated on an underlying physical computer and share the resources of the underlying computer. Accordingly, rather than implementing a single node per host computing system, multiple nodes may be deployed on a host to more efficiently use the processing resources of the computing system. These virtual nodes may include full operating system virtual machines, containers, such as Linux containers or Docker containers, jails, or other similar types of virtual containment nodes. However, although virtualization techniques provide increased efficiency within computing environments, difficulties often arise in allocating resources to the individual virtual nodes. In particular, as the quantity of virtual nodes increases in an environment, the management of providing and managing data resources for each of the virtual nodes can be difficult and cumbersome.

SUMMARY

The technology described herein enhances the management of storage repository availability in a virtual computing environment. In one implementation, a host mounts one or more storage repositories and identifies a request to initiate a virtual cluster on the host. In response to the request, the host identifies permissions associated with the virtual cluster, determines at least one storage repository from the one or more storage repositories associated with the virtual cluster, and initiates execution of the virtual cluster with access to a file system associated with the at least one storage repository.

BRIEF DESCRIPTION OF THE DRAWINGS

FIGS. 5A-5B illustrate an operational scenario of mounting a new storage repository to a host according to an implementation.

DETAILED DESCRIPTION

Figure 1:
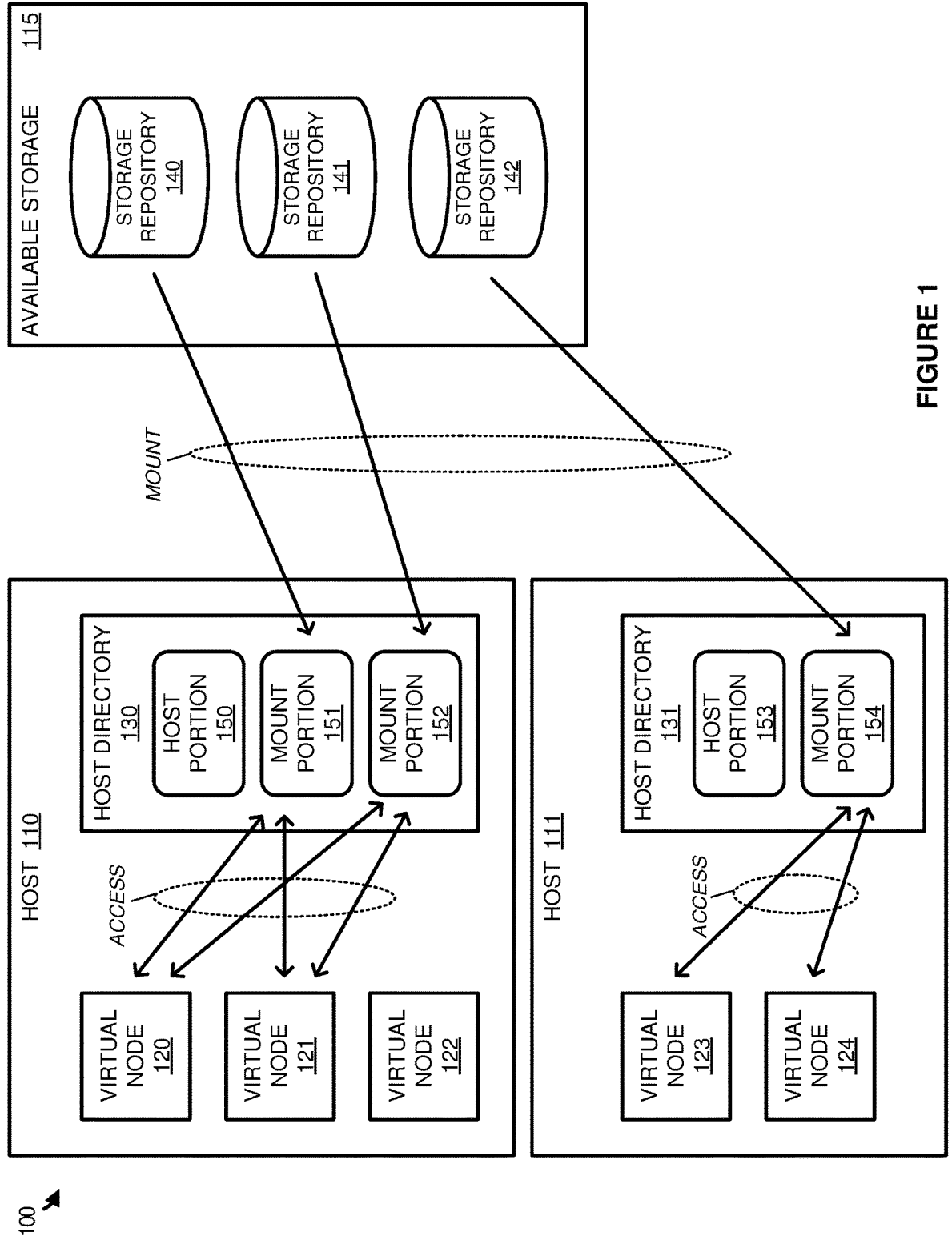
FIG. 1 illustrates a computing environment to enhance the allocation of storage resources to virtual clusters according to an implementation.

FIG. 1 illustrates a computing environment 100 to enhance the allocation of storage resources to virtual clusters according to an implementation. Computing environment 100 includes hosts 110-111 and available storage 115. Host 110 includes virtual nodes 120-122 and host directory 130, and host 111 includes virtual nodes 123-124 and host directory 131. Available storage 115 includes storage repositories 140-142, which may each comprise its own file system, distributed files system, or some other similar data storage repository. Available storage 115 may be stored on one or more computing systems, a storage area network (SAN), a networked attached storage unit, or some other separate storage device accessible to hosts 110-111.

In operation, a management system (not depicted) may identify virtual clusters for deployment in hosts 110-111 of computing environment 100. These virtual clusters may comprise containerized virtual nodes, such as Docker containers, Linux containers, or some other similar namespace-based containers. Rather than requiring a separate operating system, which is required for virtual machines, containers may share resources from the host computing system, wherein the resources may include kernel resources from the host operating system and may further include repositories and other approved resources that can be shared with other containers or processes executing on the host. Although resources may be shared between the containers on a host, the containers are provisioned to have private access to the operating system with their own identifier space, file system structure, and network interfaces. The operating system may also be responsible for allocating processing resources, memory resources, network resources, and other similar resources to the containerized endpoint.

In the present implementation, virtual nodes 120-124 may execute as part of one or more virtual clusters that require access to storage repositories 140-142. To provide the access to the various repositories, hosts 110-111 may mount at least a portion of storage repositories 140-142 and provide access to storage repositories 140-142 based on permissions allocated to the individual cluster. In some implementations, when the storage repositories are mounted, the file system for the mounted directory may be accessible in the host directory. For example, when storage repositories 140-141 are mounted to host 110, the file systems for the corresponding repository become available in host directory 130 as mount portions 151-152. Similarly, when storage repository 142 is mounted to host 111, the file system for storage repository 142 becomes available as mount portion 154. When a cluster is deployed on a host, the host may identify mount portions that should be accessible to the cluster and may permit the file system of the individual virtual nodes to access the required mount portions. For example, virtual nodes 120-121 may comprise a first cluster with permissions to access data in storage repositories 140-141. As a result, when the containers are initiated on host 110, the host operating system, or some other platform for virtual nodes 120-121, may include mount portions 151-152 in the file system available to the virtual nodes. Additionally, virtual nodes 123-124 may represent a secondary virtual cluster allocated permissions to access storage repository 142. As a result, when virtual nodes 123-124 are deployed on host 111, the directory for the virtual nodes may include mount portion 154 that corresponds to storage repository 142. Once provided access to the corresponding storage repository, processes in the container may access data within the repository as required. Advantageously, by mounting the storage repositories to the host and passing through access of the storage repositories to the associated virtual nodes, a single mount operation may be performed rather than a mount for each individual node of a processing cluster. This may improve the speed and efficiency of making repositories available, as the mount may occur prior to the initiation of the virtual nodes on a host, and only single mount may be required for each repository on the host.

In some implementations, the clusters that are deployed in hosts 110-111 may comprise large-scale data processing clusters capable of processing data in parallel with other virtual nodes in the same cluster. As a result, the storage repositories that are required for access may comprise distributed file systems or other large data repositories that can be accessed by multiple virtual nodes for efficient processing of the data.

Figure 2:
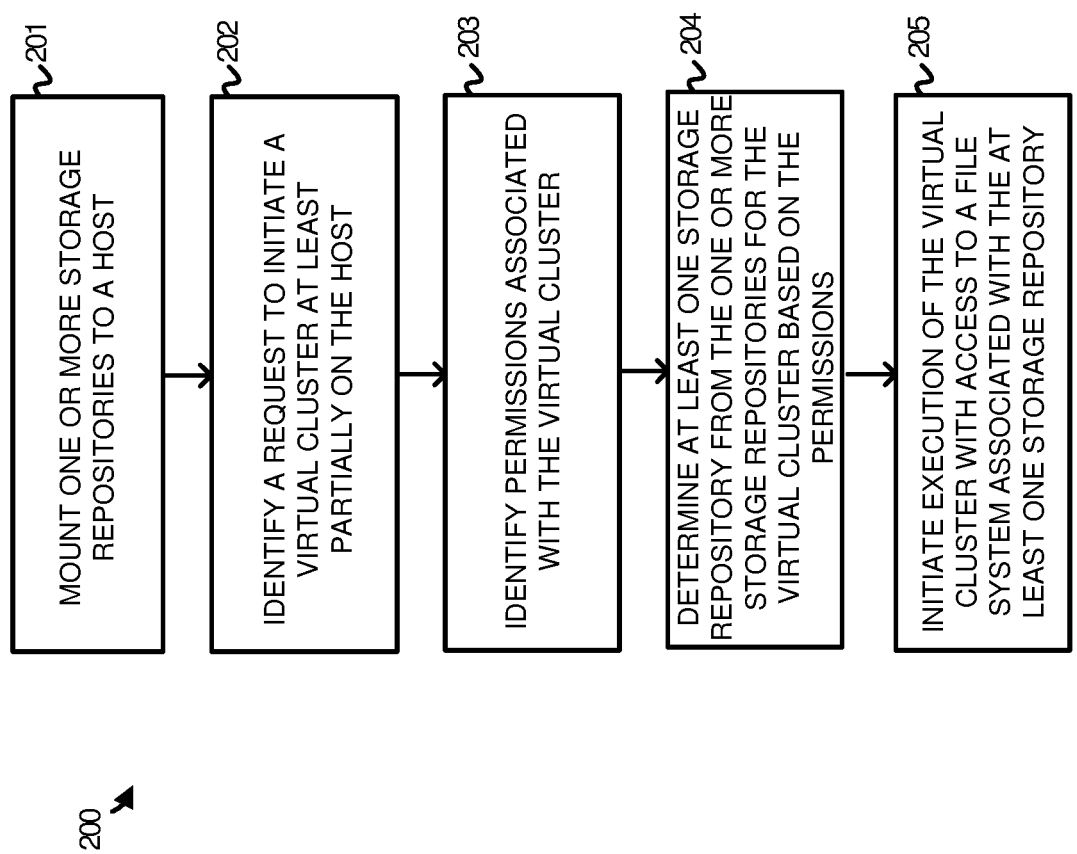
FIG. 2 illustrates an operation of a host to enhance the allocation of storage resources to virtual clusters according to an implementation.

FIG. 2 illustrates an operation 200 of a host to enhance the allocation of storage resources to virtual clusters according to an implementation. The processes of operation 200 are described parenthetically in the paragraphs that follow with reference to systems and elements of computing environment 100 of FIG. 1.

As depicted, operation 200, which can be executed by either host 110 or host 111, mounts (201) one or more storage repositories to the host. In mounting the storage repositories to the host, addressing may be provided to the host to communicatively couple the host to the storage repository, wherein the addressing may comprise an internet protocol (IP) address, a network path, or some other similar addressing information. Additionally, the host may further provide permissions for the host to access the desired storage repository. For example, when storage repository 140 is to be mounted to host 110, host 110 may provide addressing information to access the storage repository and may further provide credentials to access the storage repository. The credentials may comprise a username, password, a token or key, or some other similar credential to access storage repository 140. Once the information is provided for the storage repository, the file system for the repository may be made available in the file system of the corresponding host. Referring to the example in computing environment 100, when storage repository 140 is mounted to host 110, a mount portion 151 is added to host directory 130 that corresponds to the file system for newly available storage repository. Similarly, when storage repository 142 is mounted to host 111, an associated mount portion 154 is made available in host directory 131 that corresponds to host 111. Although demonstrated in the example of computing environment 100 as mounting storage repositories to separate hosts, the same storage repository may be mounted to multiple hosts in some examples. For example, storage repository 142 may be mounted to both host 110 and host 111.

Once the storage repositories are mounted to a corresponding host, the host may identify (202) a request to initiate a virtual cluster at least partially on the host. As an example, a management system or service associated with computing environment 100 may identify requests to initiate a virtual cluster and may determine one or more hosts capable supporting the request for the cluster. After the hosts are identified that can support the virtual cluster, a notification may be generated for the host indicating the request for the virtual cluster. In response to the request for the virtual cluster, operation 200 further identifies (203) permissions associated with the virtual cluster and determines (204) at least one storage repository from the one or more storage repositories for the virtual cluster based on the permissions.

In some implementations, hosts 110-111 may maintain permissions for different tenants (organizations or divisions of an organization) or users of computing environment 100, where each of the tenants may have access to different ones of the storage repositories. As a result, when a first tenant generates a request for a new cluster, the first tenant may be provided with access to a first set of one or more repositories. However, when a second tenant generates a request for a new cluster, the second tenant may be provided with a second set of one or more repositories. In some examples, different tenants may share one or more of the repositories. Thus, a first tenant may have access to storage repository 141, while a second tenant may have access to same storage repository. In some implementations, each of the hosts may maintain one or more data structures, such as tables, linked lists, or other similar data structures capable of matching permissions information with one or more repositories. Thus, when a request for a new cluster is obtained, the host may identify permissions information associated with the request (tenant identifier, user identifier, password, token, etc.) and compare the permissions information to the data structure to identify one or more repositories that should be made available to the cluster.

In some implementations, the management system or service for computing environment 100 may be used to generate the various permissions for the deployed cluster. In providing the permissions, the management service may indicate one or more repositories that should be made available to each of the tenants. This permissions information may be maintained in one or more tables, trees, or some other data structures. For example, when tenant issues a request for a new cluster, the management system may consult one or more data structures to determine which repositories should be made available based on the tenant identifier. In some implementations, in generating the request for a new cluster, the user or administrator associated with the new cluster may define the specific repositories that should be made available to the cluster. Thus, the permissions may provide at least one repository identifier with any additional credentials associated with the at least one repository for the new cluster.

Once at least one storage repository is determined for the new cluster, operation 200 further initiates (205) execution of the virtual cluster with access to a file system corresponding to the at least one storage repository. As described herein, when virtual nodes are deployed as containers, the platform or operating system associated with the containers may define resources that are made available to the virtual nodes. Thus, a new container may be provided access to the kernel of the operating system, and operation 200 may further ensure that processes in each of the virtual nodes can access data from required storage repositories associated with the containers. Referring to the example of virtual nodes 120-121, virtual nodes 120-121 may be provided access to mount portions 151-152 that correspond to the file systems of storage repositories 140-141.

In at least one implementation, when deploying a cluster, the administrator or user associated with the request may select an image for the virtual cluster, wherein the image may include the required configuration and deployment files for the application(s) operating on the virtual nodes of the cluster. As an example, a user may select an image corresponding to a large-scale processing framework, such as Hadoop or Spark, wherein the framework may be deployed as one or more virtual nodes that can process data in parallel. Once the image is selected along with any other resource requirements (processing, memory, storage repositories, and the like), the virtual nodes may be initiated with any additional resources allocated or provided by the associated host. These additional resources may include providing access to any storage repositories associated with the cluster request or providing access to any other files available on the host.

Figure 3:
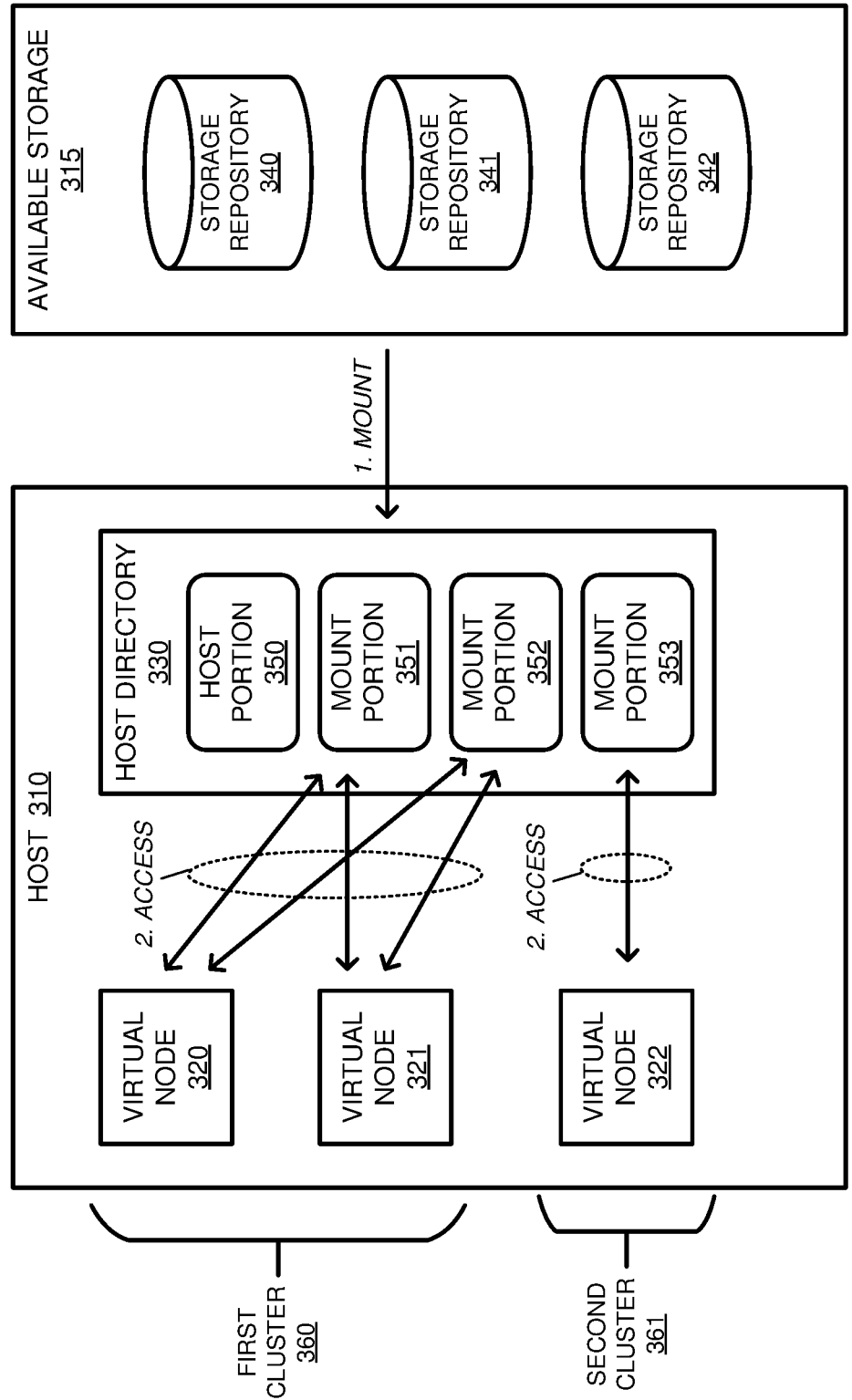
FIG. 3 illustrates an operational scenario of managing storage resources for virtual clusters according to an implementation.

FIG. 3 illustrates an operational scenario 300 of managing storage resources for virtual clusters according to an implementation. Operational scenario 300 includes host 310 and available storage 315. Host 310 includes virtual nodes 320-322, and host directory 330, wherein host directory 330 includes host portion 350 and mount portions 351-353. Available storage 315 further includes storage repositories 340-342, wherein storage repositories 340-342 correspond to mount portions 351-353.

In operation, host 310 may mount, at step 1, storage repositories 340-342, permitting corresponding mount portions 351-353 to become available in host directory 330. This mounting operation may include obtaining required addressing and/or credential information to access storage repositories 340-342, and once obtained, using the addressing and/or credential information to mount the file systems associated with the repositories as mount portions 351-353. Once the repositories are mounted to host 310, virtual nodes of clusters 360-361 may be initiated, wherein each of the clusters may be provided with permissions information to access, at step 2, one or more of storage repositories 340-342.

Referring to the example of first cluster 360, when virtual nodes 320-321 are initiated, virtual nodes 320-321 may be associated with credentials to access storage repositories 340-341. These credentials may include a tenant identifier associated with first cluster 360, definitions from the requesting administrator indicating the required repositories, or some other similar credential information indicating required storage repositories. As a result, the directories for virtual nodes 320-321 may include access to mount portions 351-352 shared on or by host 310. However, although mount portions 351-352 are made available to virtual nodes 320-321, virtual nodes 320-321 may not identify that storage repository 342 is mounted to the host or made available to other virtual nodes executing on the host. In contrast, second cluster 361 with virtual node 322 is associated with storage repository 342 and may access the data using mount portion 353 that is made accessible in the file system directory for virtual node 322. Additionally, because storage repositories 340-341 are not associated with virtual node 322, host 310 will not grant permissions to access or view mount portions 351-352.

Although described in the previous example as mounting the repositories to host 310 prior to the initiation of the virtual nodes, storage repositories may be mounted during the execution of the virtual nodes in some examples. For example, first cluster 360 may initiate with access to storage repository 340 using mount portion 351. However, after initiation, storage repository 341 may be mounted to host 310 and permissions may be allocated to first cluster 360 to provide access to the cluster. As a result, the operating system or other platform for virtual nodes 320-321 may modify the file system of virtual nodes 320-321 such that the virtual nodes may access new mount portion 352 that corresponds to storage repository 341.

Figure 4A:
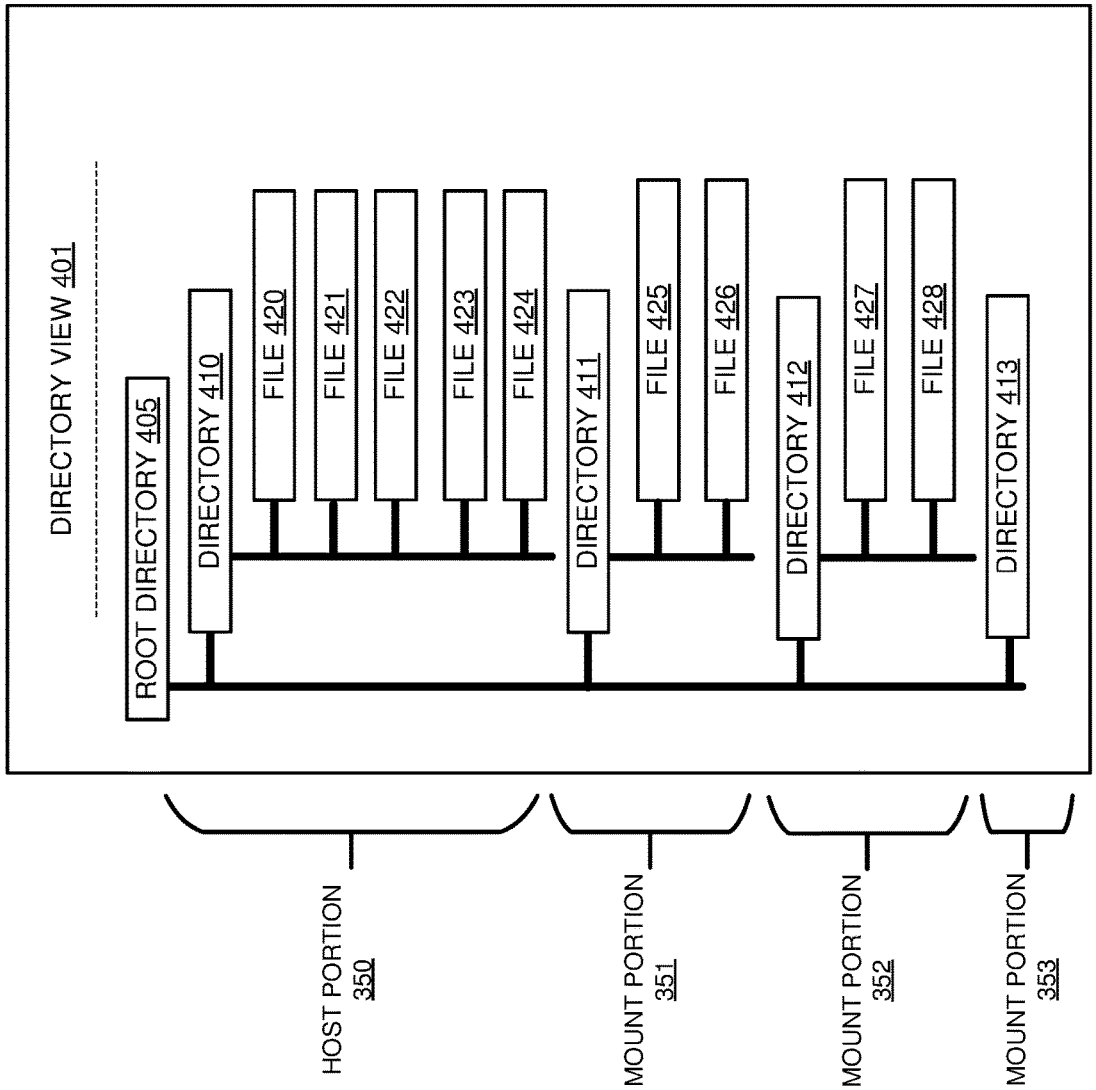
FIG. 4A illustrates a directory view for a host according to an implementation.

FIG. 4A illustrates a directory view for a host according to an implementation. Directory view 401 includes root directory 405, directories 410-413, and files 420-428. Directory 410 includes files 420-424, which represent the contents of host portion 350 from operational scenario 300 of FIG. 3. Directories 411-413 each correspond to one of mount portions 351-353, wherein mount portions 351-353 represent the file systems for storage repositories 340-342 of operational scenario 300 of FIG. 3.

In operation, a host for virtual nodes may mount storage repositories that are capable of being made available to the individual virtual nodes. Here, three different storage repositories are mounted to the host, permitting the host to access files and directories located on the repositories. These portions of directory view 401 include directories 411-413 that each correspond to a storage repository of storage repositories 340-342. After the various repositories are mounted or attached to the host, virtual nodes may be initiated, wherein the virtual nodes may share kernel resources supplied by the host and represented as host portion 350 and may further be allocated access to one or other resources, such as the file systems for mounted storage repositories.

Figure 4B:
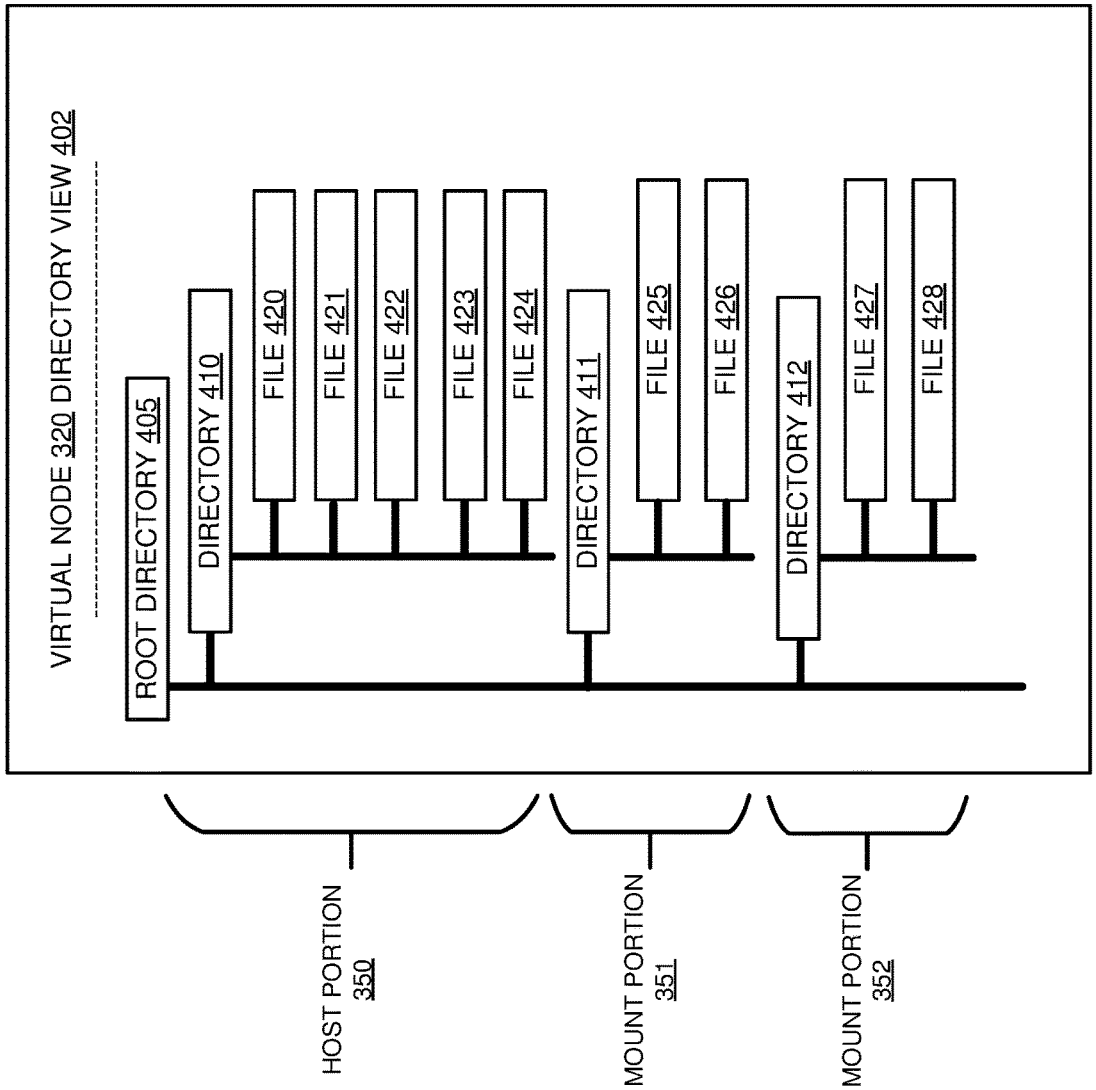
FIG. 4B illustrates a directory view for a virtual node according to an implementation.

FIG. 4B illustrates a directory view 402 for a virtual node according to an implementation. Directory view 402 is representative of a directory view for virtual node 320 of operational scenario 300 of FIG. 3. Directory view 402 includes root directory 405, directories 410-412, and files 420-428. Directory 410 includes files 420-424, which represent the contents of host portion 350 from operational scenario 300 of FIG. 3. Directories 411-412 each correspond to one of mount portions 351-352, wherein mount portions 351-352 represent the file systems for storage repositories 340-341 of operational scenario 300 of FIG. 3. Although not depicted in the example of FIG. 4B, it should be understood that each virtual node may have its own unique files and directories in addition to those of the shared host files and storage repository files. These files may be used in the configuration and execution of one or more applications or processes on the individual virtual node. Moreover, while depicted with all of the files from the host, it should be understood that the virtual node may only have access to a portion of the host data, including at least the kernel.

As described herein, the host for virtual node 320 may determine permissions associated with the nodes and provide access to storage repositories based on the permissions. Here, because virtual nodes 320 is allocated permissions to access storage repositories 340-341, directory view 402 may include mount portions 351-352 that correspond to repositories 340-341. However, while the file systems for storage repositories 340-341 are made accessible to the corresponding nodes, the host may ensure that that storage repository 342 is neither accessible nor identifiable as mounted to the host. In particular, the host may ensure that although the repository is mounted and available in the host directory, the repository is unavailable in virtual nodes without permissions to access the repository.

In some implementations, the repositories and resources that are allocated to the virtual nodes may be dynamic during the execution of the virtual nodes. For example, one or more storage repositories that are allocated to a cluster may be added, removed, or otherwise modified during the execution of the cluster. As an example, virtual node 320 is initially provided access to mount portion 351, however, an administrator or user associated with the cluster may modify the permissions of the cluster. Consequently, the host may revoke the permissions to access the repository, making the data from the repository inaccessible to the virtual node. Similarly, when a new repository is mounted to the host, permissions may be modified for the host to permit one or more virtual nodes executing thereon to access the new repository. These permissions may add the mounted repository to the file system directory of the one or more virtual nodes, permitting applications on the one or more virtual nodes to access required files and directories.

In some implementations, each of the storage repositories may be associated with one or more tenants, wherein the tenants may comprise different organizations or different segments of an organization. For example, tenants for an organization may comprise a development tenant, a finance tenant, a legal tenant, and the like. As a result, when a request is generated for a new cluster, the host may identify a tenant associated with the request and determine one or more repositories associated with the tenant. Once the repositories are identified, the repositories may be made available in the file system directory of each of the nodes associated with the cluster. In some examples, when a cluster request is identified by the host, the host may identify permissions associated with the request, wherein the permissions may comprise a tenant identifier, a tenant password, a key, a token, or some other similar permissions. The permissions may then be used to identify one or more repositories that should be allocated to the cluster.

Figure 5B:
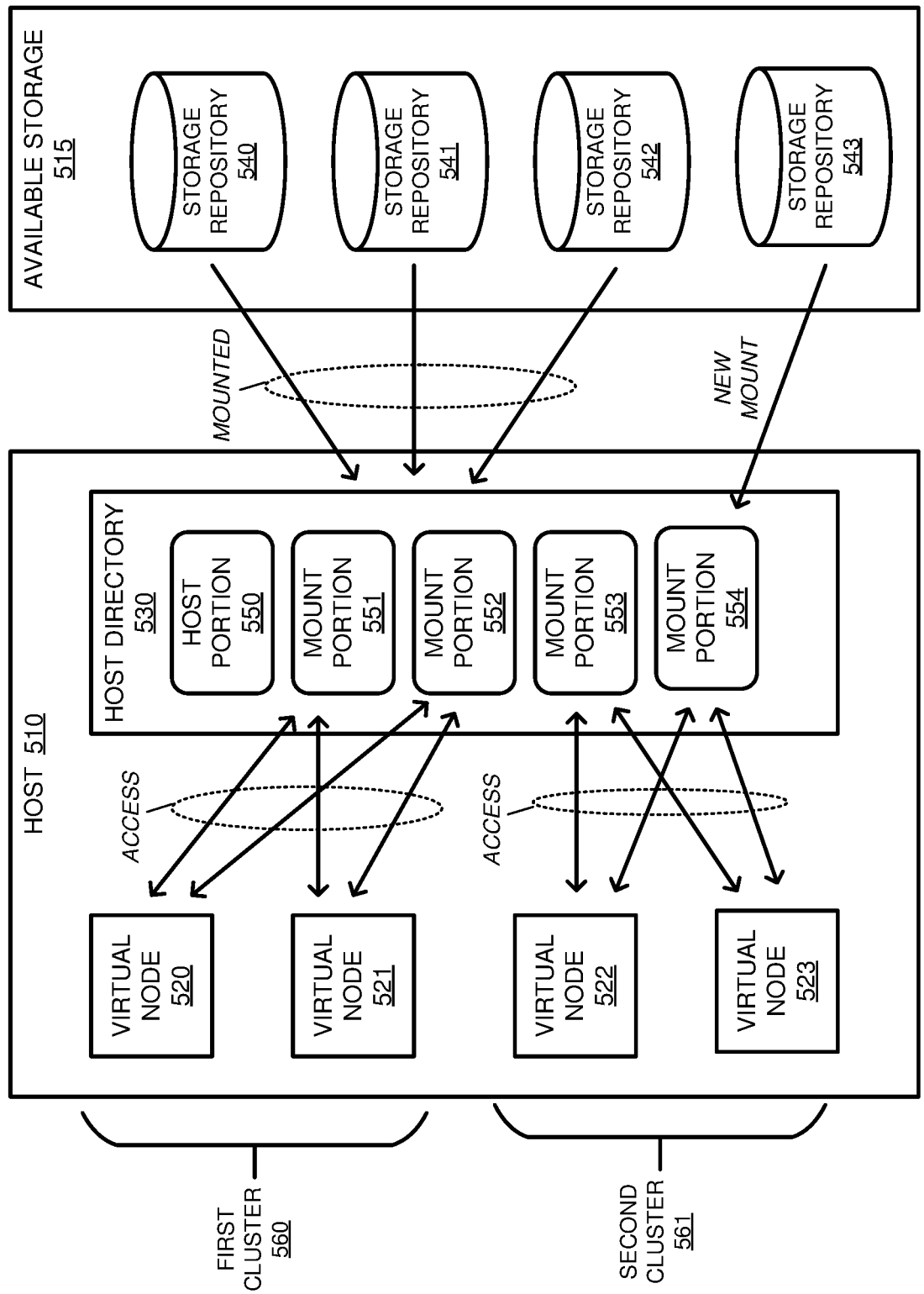

FIGS. 5A-5B illustrate an operational scenario of mounting a new storage repository to a host according to an implementation. FIG. 5A includes host 510 and available storage 515. Host 510 includes virtual nodes 520-523 and host directory 530 with host portion 550 and mount portions 551-553. Virtual nodes 520-521 correspond to first cluster 560, while virtual nodes 522-523 correspond to second cluster 561. Available storage 515 includes storage repositories 540-543, which may represent various file systems and distributed file systems that can be mounted from one or more devices. In FIG. 5A, storage repositories 540-542 are attached or mounted to host 510, where the file systems are represented as mount portions 551-553. In FIG. 5B, storage repositories 540-543 are attached or mounted and an additional file system is represented in host directory 530 as mount portion 554.

Referring first to FIG. 5A, storage repositories 540-542 are initially mounted to host 510 to provide data resources to virtual nodes 520-523, wherein virtual nodes 520-523 are representative of nodes that operate in clusters 560-561 to provide various data operations on the data in storage repositories 540-542. To make the data available, host 510 may initiate an operation to mount each of the storage repositories, wherein the mounting operation attaches the file system of the storage repositories and makes the file systems available from a mount point in the host system. Here, the file systems are represented in host directory 530 as mount portions 551-553.

Once the repositories are mounted to host 510, host 510 may make the repositories available to virtual nodes executing on host 510. In determining which of the virtual nodes should be allocated which of the repositories, each overarching cluster associated with the virtual node may be associated with permissions that dictate the repositories for the individual nodes. These permissions may be determined based on the tenant associated with the cluster (e.g., accounting department, development department, etc.), may be based on a token provided during the generation of the cluster, may be based on a username and password provided during the generation of the cluster, or may be provided in some other similar manner. As demonstrated in FIG. 5A, first cluster 560 is provided access to storage repositories 540-541, while second cluster 561 is provided access to storage repository 543. As a result, when the virtual nodes are deployed, each of the virtual nodes may be provided with file system access to the corresponding mount portions of mount portions 551-553. In particular, virtual nodes 520-521 may each possess access permissions for mount portions 551-552, and virtual nodes 522 may access mount portion 553.

Turning to FIG. 5B, FIG. 5B demonstrates when a new storage repository 543 is mounted to host 510. Similar to the operations described above for storage repositories 540-542, when host 510 initiates a mount operation of storage repository 543, the repository is attached to the host and the file system contents are made available in host directory 530, wherein the contents associated with storage repository 543 are demonstrated as mount portion 554 in host directory 543. Once mounted, the host may determine whether one or more of the virtual nodes is associated with the newly mounted storage repository. This determination may be based on the tenant associated with the cluster, any username or password information associated with the cluster, or some other similar permissions information. For example, when the storage repository is mounted, the repository may be associated with permissions information indicating tenants, clusters, or some other classifier capable of identifying virtual nodes that can access and process data from the repository.

In the example of FIG. 5B, host 510 determines that second cluster 561 includes the required permissions to access storage repository 543. As a result, host 510 may add mount portion 554 to the directories for each of virtual nodes 522-523, permitting the virtual nodes to access the required files and directories from storage repository 543. In accessing the repository, the permissions may further indicate, which of the clusters or tenants are permitted to read from the repository, which of the clusters or tenants are permitted to write to the repository, or which of the tenants or clusters may provide some other operation with respect to the data in the repository.

Figure 6:
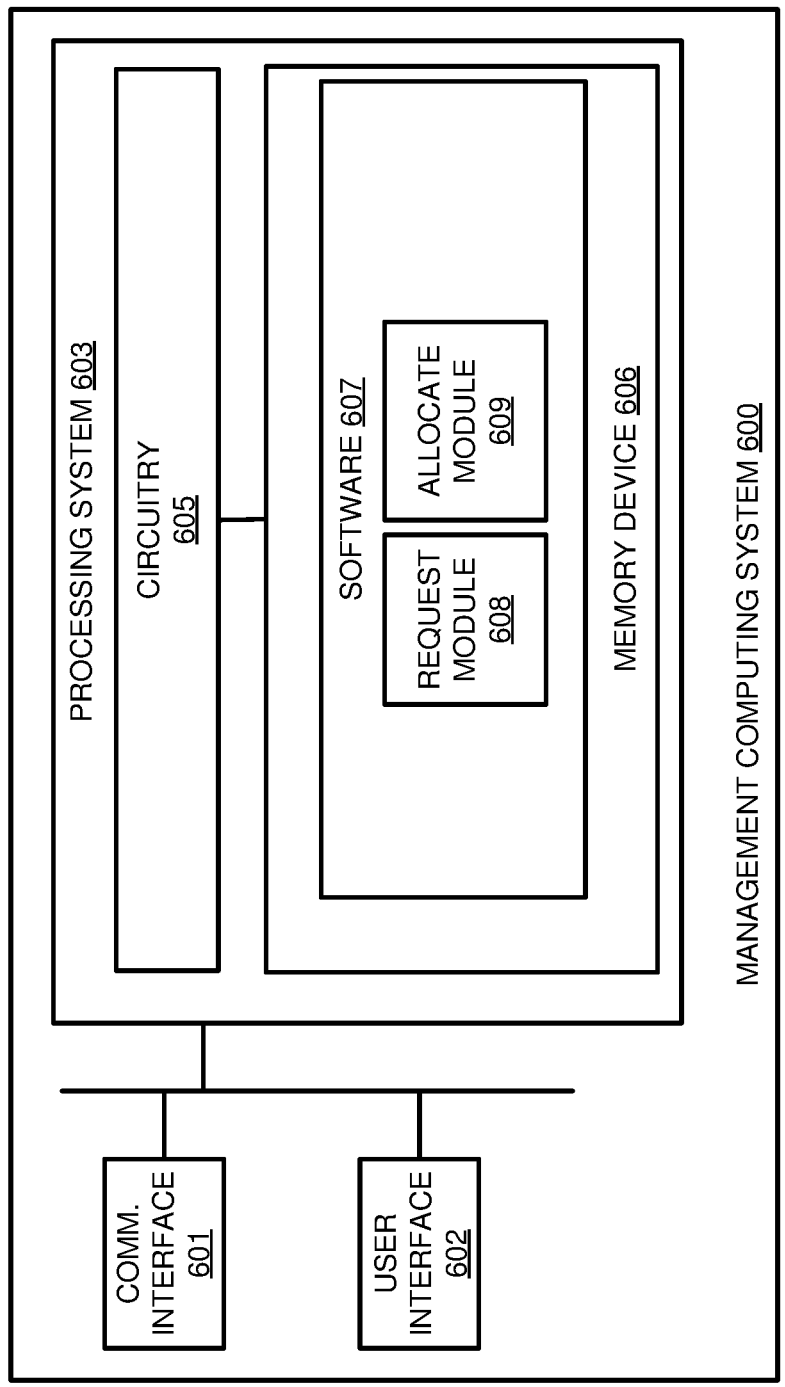
FIG. 6 illustrates a management computing system according to an implementation.

FIG. 6 illustrates a management computing system 600 according to an implementation. Computing system 600 is representative of any computing system or systems with which the various operational architectures, processes, scenarios, and sequences disclosed herein for a management system may be implemented. Computing system 600 is an example management system that could be used in initiating and configuring clusters on host systems as described herein. Computing system 600 comprises communication interface 601, user interface 602, and processing system 603. Processing system 603 is linked to communication interface 601 and user interface 602. Processing system 603 includes processing circuitry 605 and memory device 606 that stores operating software 607. Computing system 600 may include other well-known components such as a battery and enclosure that are not shown for clarity.

Communication interface 601 comprises components that communicate over communication links, such as network cards, ports, radio frequency (RF), processing circuitry and software, or some other communication devices. Communication interface 601 may be configured to communicate over metallic, wireless, or optical links. Communication interface 601 may be configured to use Time Division Multiplex (TDM), Internet Protocol (IP), Ethernet, optical networking, wireless protocols, communication signaling, or some other communication format—including combinations thereof. In at least one implementation, communication interface 601 may be used to communicate with one or more hosts of a computing environment, wherein the hosts execute virtual nodes to provide various processing operations.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. User interface 602 may be omitted in some examples.

Processing circuitry 605 comprises microprocessor and other circuitry that retrieves and executes operating software 607 from memory device 606. Memory device 606 may include volatile and nonvolatile, removable and non-removable media implemented in any method or technology for storage of information, such as computer readable instructions, data structures, program modules, or other data. Memory device 606 may be implemented as a single storage device, but may also be implemented across multiple storage devices or sub-systems. Memory device 606 may comprise additional elements, such as a controller to read operating software 607. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing circuitry 605 is typically mounted on a circuit board that may also hold memory device 606 and portions of communication interface 601 and user interface 602. Operating software 607 comprises computer programs, firmware, or some other form of machine-readable program instructions. Operating software 607 includes request module 608 and allocate module 609, although any number of software modules may provide a similar operation. Operating software 607 may further include an operating system, utilities, drivers, network interfaces, applications, or some other type of software. When executed by processing circuitry 605, operating software 607 directs processing system 603 to operate computing system 600 as described herein.

In one implementation, management computing system 600 may be used to allocate virtual clusters and the corresponding virtual nodes to one or more host systems in a computing environment. These host systems may comprise physical computing elements, such as server computing systems, or may comprise virtual machines operating on a physical computing system. In operation, request module 608 may identify a request for a cluster, wherein the request may identify processing resources to be allocated to the cluster, memory resources to be allocated to the cluster, storage repositories to be made available to the cluster, the type of software to be made available to the cluster, the tenant associated with the cluster, or some other similar information about the cluster. In response to the request, allocate module 609 may generate a request that is provided to one or more host computing systems to support the new virtual cluster. In some implementations, in addition to the request, allocate module 609 may provide information about the resources required for the cluster (processing, memory, and the like) and may further include permissions information for the storage repositories associated with the cluster. These permissions may identify the specific repositories available to the cluster, the tenant associated with the cluster, a key or token to access repositories, or some other similar permissions that permit the one or more host computing systems to identify the storage repositories to be made available to the cluster.

In some examples, management computing system 600 may further be used to dynamically modify the configuration of a cluster, wherein the modifications may include modifying the repositories that are made available to the cluster. These modifications may include requests to add a storage repository to an executing cluster, remove a storage repository from an executing cluster, or some other similar operation.

Although demonstrated as separate from a host computing system, it should be understood that request module 608 and allocate module 609 may be collocated on a host for the virtual nodes. For example, when a request is generated, allocate module 609 may allocate the required processing and storage repository resources prior to initiating the virtual nodes to support a cluster request.

Figure 7:
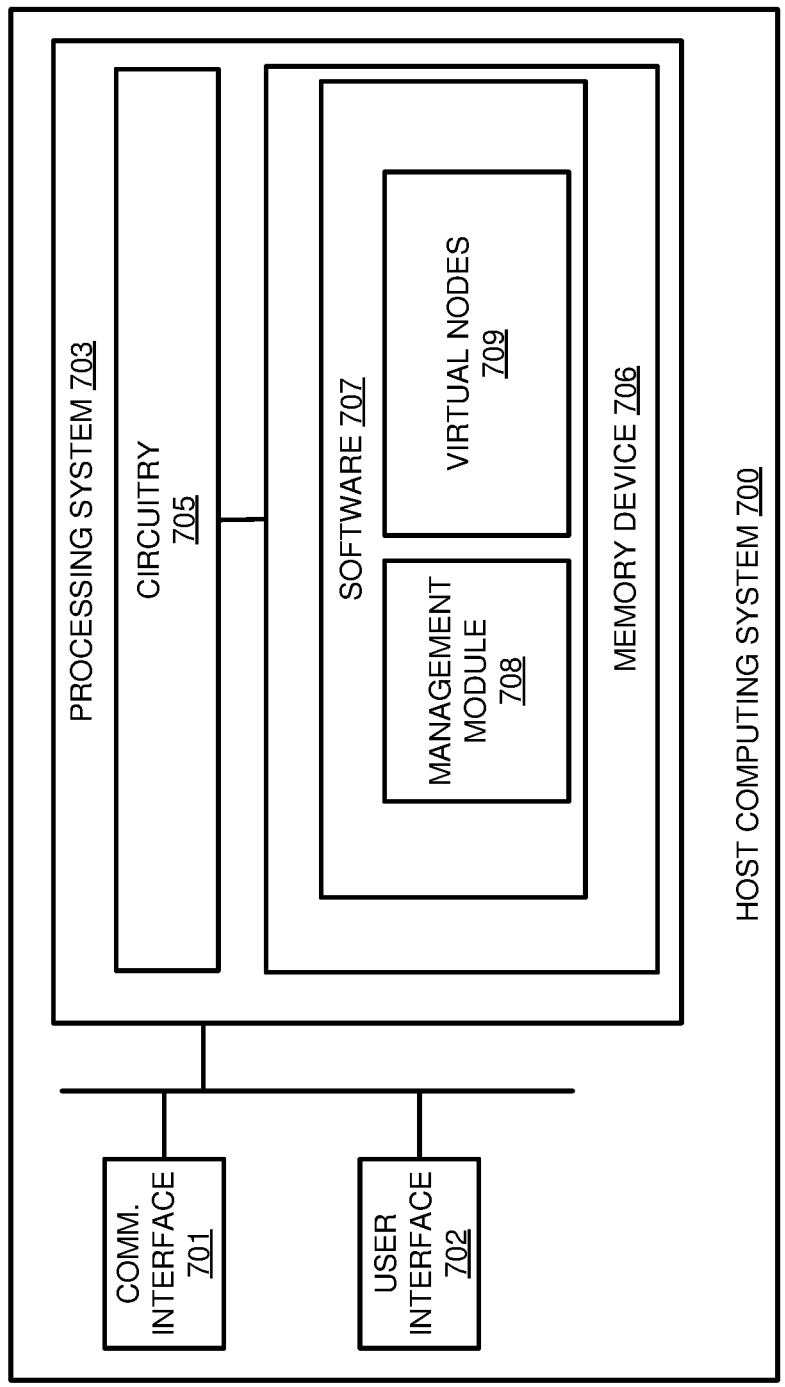
FIG. 7 illustrates a host computing system according to an implementation.

FIG. 7 illustrates a host computing system 700 according to an implementation. Computing system 700 is representative of any computing system or systems with which the various operational architectures, processes, scenarios, and sequences disclosed herein for a host may be implemented. Computing system 700 is an example of hosts 110-111, 310, and 510, although other examples may exist. Computing system 700 comprises communication interface 701, user interface 702, and processing system 703. Processing system 703 is linked to communication interface 701 and user interface 702. Processing system 703 includes processing circuitry 705 and memory device 706 that stores operating software 707. Computing system 700 may include other well-known components such as a battery and enclosure that are not shown for clarity.

Communication interface 701 comprises components that communicate over communication links, such as network cards, ports, radio frequency (RF), processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format including combinations thereof. In at least one implementation, communication interface 701 may be used to communicate with one or more other hosts of a computing environment and a management system, such as management computing system 600, for configuration information related to executable virtual nodes. Communication interface 701 may further communicate with one or more storage repositories that may be located on other computing systems or storage systems. These storage repositories may be coupled to computing system 700 using Ethernet, Fibre Channel, Peripheral Component Interconnect Express (PCIe), or some other similar connection, wherein the storage repository may be mountable and accessible to multiple hosts in a computing environment.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples.

Processing circuitry 705 comprises microprocessor and other circuitry that retrieves and executes operating software 707 from memory device 706. Memory device 706 may include volatile and nonvolatile, removable and non-removable media implemented in any method or technology for storage of information, such as computer readable instructions, data structures, program modules, or other data. Memory device 706 may be implemented as a single storage device, but may also be implemented across multiple storage devices or sub-systems. Memory device 706 may comprise additional elements, such as a controller to read operating software 707. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing circuitry 705 is typically mounted on a circuit board that may also hold memory device 706 and portions of communication interface 701 and user interface 702. Operating software 707 comprises computer programs, firmware, or some other form of machine-readable program instructions. Operating software 707 includes data request module 708 and virtual nodes 709, although any number of software modules may provide a similar operation. Operating software 707 may further include an operating system, utilities, drivers, network interfaces, applications, or some other type of software. When executed by processing circuitry 705, operating software 707 directs processing system 703 to operate computing system 700 as described herein.

In one implementation, virtual nodes 709, which may comprise containers in some examples, are executed by processing system 703 to provide various data processing operations. In some examples, virtual nodes 709 may represent nodes that operate in one or more clusters that provide large-scale data processing operations on data sets, wherein the data sets may be provided to the clusters as one or more storage repositories that each store data as file systems or distributed file systems. To provide access to each of the storage repositories, management module 708 may mount one or more storage repositories to host 700, wherein mounting the repositories permits the file systems associated with repositories to be made available on the host.

Once the repositories are mounted and the file systems are available to the host directory, clusters may be deployed on host 700, wherein the clusters may include one or more virtual nodes of virtual nodes 709. When a cluster is to be deployed, management module 708 may determine one or more repositories that should be made available to the cluster based on permissions associated with the request for the deployment. These permissions may explicitly define the repositories that should be made available to the cluster, may identify a tenant associated with the cluster, may define a token or key associated with the cluster, or may provide any other information to define the repositories that should be made available to the cluster. Once the repositories are identified, management module 708 may initiate the cluster with each virtual node of the cluster provided access to the required storage repositories. In providing access to the required storage repositories, the host may pass-through the file systems associated with the repositories, such that the virtual nodes may access the data in the repositories. In passing through the file systems, a single mount may be performed for the host, while the file system for the repositories may be passed through to the individual virtual nodes.

Although described above as providing access to data repositories at the time of initiation, resources may be dynamically added or removed from the cluster. In some implementations, the resources may include the allocation of data repositories, wherein an administrator may request that a new repository is mounted to host 700, which is then passed through to one or more clusters operating on the host. Similarly, an administrator may desire to remove access to a storage repository for one or more clusters. As a result, instead of unmounting the repository from each of the virtual nodes, the repository may be unmounted from the host, which prevents access from any nodes that might have possessed passthrough access to the repository. In this manner rather than managing a repository mount to each individual node of a cluster, the host may mount the repository once and provide permissions and accessibility to the repository for any associated node on the host.

Returning to the elements of FIG. 1, hosts 110-111 may each comprise communication interfaces, network interfaces, processing systems, computer systems, microprocessors, storage systems, storage media, or some other processing devices or software systems, and can be distributed among multiple devices. Examples of hosts 110-111 can include software such as an operating system, logs, databases, utilities, drivers, networking software, and other software stored on a computer-readable medium. Hosts 110-111 may comprise, in some examples, one or more server computing systems, desktop computing systems, laptop computing systems, or any other computing system, including combinations thereof. In some implementations hosts 110-111 may comprise virtual machines that comprise abstracted physical computing elements and an operating system capable of providing a platform for the virtual nodes. Hosts 110-111 may operate on the same physical computing system or may execute across multiple computing systems in these examples.

Available storage 115 may reside on any computing system or systems that can include communication interfaces, network interfaces, processing systems, computer systems, microprocessors, storage systems, storage media, or some other processing devices or software systems, and can be distributed among multiple devices. Available storage 115 may be located on one or more server computing systems, desktop computing systems, laptop computing systems, or any other computing system, including combinations thereof.

Communication between hosts 110-111 and available storage 115 may use metal, glass, optical, air, space, or some other material as the transport media. Communication between hosts 110-111 and available storage 115 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between hosts 110-111 and available storage 115 be a direct link or can include intermediate networks, systems, or devices, and can include a logical network link transported over multiple physical links. In some implementations hosts 110-111 may communicate with available storage 115 using ethernet, however, it should be understood that the communication may comprise PCIe, Fibre Channel, or some other similar communication protocol.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
mounting one or more storage repositories to a host, the mounting including performing a single mount operation for each storage repository of the one or more storage repositories to make a file system for the storage repository accessible in a host directory as a mount portion;
identifying a request to initiate a virtual cluster at least partially on the host, wherein the virtual cluster comprises a plurality of virtual nodes, each of the virtual nodes being deployed as a container;
identifying permissions associated with the virtual cluster, the permissions including information for the plurality of virtual nodes of the virtual cluster to access data in at least one storage repository of the one or more storage repositories;
determining the at least one storage repository from the one or more storage repositories for the virtual cluster based on the request and the identified permissions for the virtual cluster; and
initiating execution of the virtual cluster with access by the plurality of virtual nodes of the virtual cluster to at least one file system corresponding to the at least one storage repository, wherein the at least one file system corresponding to the at least one storage repository is accessible to the plurality of virtual nodes of the virtual cluster based on the single mount operation performed for the at least one storage repository.

2. The method of claim 1, wherein the host comprises a virtual machine.

3. The method of claim 1, wherein the one or more storage repositories comprise one or more distributed file systems.

4. The method of claim 1, wherein the permissions associated with the virtual cluster comprise a tenant identifier, and wherein determining the at least one storage repository from the one or more storage repositories for the virtual cluster based on the request and the identified permissions for the virtual cluster comprises determining the at least one storage repository from the one or more storage repositories based on the tenant identifier.

5. The method of claim 1 further comprising:
mounting at least one additional storage repository to the host;
determining when the at least one additional storage repository is associated with the virtual cluster; and
when the at least one additional storage repository is associated with the virtual cluster, providing access by the plurality of virtual nodes to at least one file system corresponding to the at least one additional storage repository.

6. The method of claim 1, wherein the one or more storage repositories are accessible using Ethernet, Fibre Channel, or Peripheral Component Interconnect Express (PCIe) from the host.

7. The method of claim 1, wherein mounting the one or more storage repositories to the host includes obtaining addressing information, credential information, or both to access the one or more storage repositories and using the addressing information, credential information, or both to mount file systems associated with the one or more storage repositories as mount portions.

8. A computing apparatus comprising:
one or more non-transitory computer-readable storage media;
a processing system operatively coupled to the one or more non-transitory computer readable storage media; and
program instructions stored on the one or more non-transitory computer-readable storage media that, when executed by the processing system, direct the processing system to:
mount one or more storage repositories to a host, the mounting including performing a single mount operation for each storage repository of the one or more storage repositories to make a file system for the storage repository accessible in a host directory as a mount portion;
identify a request to initiate a virtual cluster at least partially on the host, wherein the virtual cluster comprises a plurality of virtual nodes, each of the virtual nodes being deployed as a container;
identify permissions associated with the virtual cluster, the permissions including information for the plurality of virtual nodes of the virtual cluster to access data in at least one storage repository of the one or more storage repositories;
determine the at least one storage repository from the one or more storage repositories for the virtual cluster based on the request and the identified permissions for the virtual cluster; and
initiate execution of the virtual cluster with access by the plurality of virtual nodes of the virtual cluster to at least one file system corresponding to the at least one storage repository, wherein the at least one file system corresponding to the at least one storage repository is accessible to the plurality of virtual nodes of the virtual cluster based on the single mount operation performed for the at least one storage repository.

9. The computing apparatus of claim 8, wherein the host comprises a virtual machine.

10. The computing apparatus of claim 8, wherein the one or more storage repositories comprise one or more distributed file systems.

11. The computing apparatus of claim 8, wherein the permissions associated with the virtual cluster comprise a tenant identifier, and wherein determining the at least one storage repository from the one or more storage repositories for the virtual cluster based on the request and the identified permissions for the virtual cluster comprises determining the at least one storage repository from the one or more storage repositories based on the tenant identifier.

12. The computing apparatus of claim 8, wherein the program instructions further direct the processing system to:
mount at least one additional storage repository to the host;
determine when the at least one additional storage repository is associated with the virtual cluster; and
when the at least one additional storage repository is associated with the virtual cluster, provide access by the plurality of virtual nodes to at least one file system corresponding to the at least one additional storage repository.

13. The computing apparatus of claim 8, wherein the one or more storage repositories are accessible using Ethernet, Fibre Channel, or Peripheral Component Interconnect Express (PCIe) from the host.

14. A non-transitory machine-readable medium comprising instructions that, when executed by a processor, direct the processor to:
- mount one or more storage repositories to a host, the mounting including performing a single mount operation for each storage repository of the one or more storage repositories to make a file system for the storage repository accessible in a host directory as a mount portion;
- identify a request to initiate a virtual cluster at least partially on the host, wherein the virtual cluster comprises a plurality of virtual nodes, each of the virtual nodes being deployed as a container;
- in response to the request, identify permissions associated with the virtual cluster, the permissions including information for the plurality of virtual nodes of the virtual cluster to access data in at least one storage repository of the one or more storage repositories;
- determine the at least one storage repository from the one or more storage repositories for the virtual cluster based on the request and the identified permissions for the virtual cluster; and
- initiate execution of the virtual cluster with access by the plurality of virtual nodes of the virtual cluster to at least one file system corresponding to the at least one storage repository, wherein the at least one file system corresponding to the at least one storage repository is accessible to the plurality of virtual nodes of the virtual cluster based on the single mount operation performed for the at least one storage repository.

15. The machine-readable medium of claim 14, wherein the one or more storage repositories comprise one or more distributed file systems.

16. The machine-readable medium of claim 14, wherein the permissions associated with the virtual cluster comprise a tenant identifier, and wherein determining the at least one storage repository from the one or more storage repositories for the virtual cluster based on the request the identified permissions for the virtual cluster comprises determining the at least one storage repository from the one or more storage repositories based on the tenant identifier.

17. The machine-readable medium of claim 14, wherein the instructions further comprise instructions directing the processor to:
- mount at least one additional storage repository to the host;
- determine when the at least one additional storage repository is associated with the virtual cluster; and
- when the at least one additional storage repository is associated with the virtual cluster, provide access by the plurality of virtual nodes to at least one file system corresponding to the at least one additional storage repository.

18. The machine-readable medium of claim 14, wherein the one or more storage repositories are accessible using Ethernet, Fibre Channel, or Peripheral Component Interconnect Express (PCIe) from the host.

* * * * *